(12) United States Patent
Shlakhetski (10) Patent No.: US 12,313,043 B2
(45) Date of Patent: May 27, 2025

(54) GRAVITATIONAL-TO-KINETIC ENERGY CONVERTER

(71) Applicant: MATUNA HOLDINGS LTD, Jerusalem (IL)

(72) Inventor: Viktor Shlakhetski, Ashqelon (IL)

(73) Assignee: MATUNA HOLDINGS LTD, Jerusalem (IL)

( * ) Notice: Subject to any disclaimer, the term of this patent is extended or adjusted under 35 U.S.C. 154(b) by 0 days.

(21) Appl. No.: 18/853,511

(22) PCT Filed: Dec. 25, 2023

(86) PCT No.: PCT/US2023/085877
§ 371 (c)(1),
(2) Date: Oct. 2, 2024

(87) PCT Pub. No.: WO2024/145267
PCT Pub. Date: Jul. 4, 2024

(65) Prior Publication Data
US 2025/0109738 A1    Apr. 3, 2025

Related U.S. Application Data

(60) Provisional application No. 63/435,353, filed on Dec. 27, 2022.

(51) Int. Cl.
*F03G 3/08*    (2006.01)
*F03G 3/02*    (2006.01)
*F03G 7/10*    (2006.01)

(52) U.S. Cl.
CPC .............. *F03G 3/08* (2013.01); *F03G 3/02* (2013.01); *F03G 7/10* (2013.01)

(58) Field of Classification Search
CPC ........................................ F03G 3/02
See application file for complete search history.

(56) References Cited

U.S. PATENT DOCUMENTS

| 2003/0155770 A1 | 8/2003 | Clinch |
| 2016/0237992 A1 | 8/2016 | Chicoski |
| 2020/0049132 A1 | 2/2020 | Traner et al. |

FOREIGN PATENT DOCUMENTS

| CN | 108661867 A | * 10/2018 | |
| FR | 2830289 A1 | 4/2003 | |
| JP | 2016205358 A | * 12/2016 | |
| KR | 20090054794 A | 6/2009 | |
| WO | WO-2009096765 A1 | * 8/2009 | ............... F03G 3/00 |

* cited by examiner

*Primary Examiner* — Vicky A Johnson (57) ABSTRACT

The present disclosure relates to methods and systems for converting gravitational energy to kinetic energy. More specifically, in order to obtain the energy of gravity using centrifugal forces from the space on a rotating platform 2, rails are installed on it along which weighted shuttles can move. When the platform rotates, centrifugal forces act on the rotating weighted shuttles. Under the centrifugal forces, the weighted translate radially, which perform work when moving. To use the work performed by the rotating weighted shuttles the shaft is coupled to a commutator.

20 Claims, 5 Drawing Sheets

GRAVITATIONAL-TO-KINETIC ENERGY CONVERTER

BACKGROUND

The present disclosure is directed to systems and methods for rotary kinetic energy storage and retrieval mechanisms. Specifically, the disclosure is directed to systems and methods for converting natural gravitational energy to kinetic energy and its utilization.

Currently, a technological revolution is taking place in the production and use of energy, with its essence in replacing the sources of industrial energy, which is the energy released by the oxidation of hydrocarbons, as well as the use of solar radiation.

Over the past 50 years, flywheel-based energy storage devices have been set forth in the prior art, having various forms and combinations, intended to convert electric power to kinetic energy stored in a spinning flywheel, and generate electric power from its rotary inertia. Most of these flywheel storage devices provide only short duration power due to their high continuous losses. They require periodic maintenance, so they are usually housed in accessible locations. These locations are generally not consistent with flywheel safety. A flywheel that does not require maintenance can be housed in a relatively inaccessible location that can safely absorb the stored flywheel energy if it should ever explosively disintegrate.

For example, U.S. Pat. No. 5,614,777 discloses and claims a flywheel based energy storage system using an integral motor/generator, high speed flywheel, and magnetic bearings. The system disclosed in the '777 patent is costly since composite rotor materials are required, does not allow for minimum power, and an active thrust bearing is required to provide the necessary force to lift the rotor and maintain levitation for active axial position control. Further, the patented system does not allow for a large motor/generator to provide high power discharges for short durations due to the nature of the construction with the motor/generator located outboard of the bearings where increasing the size would cause significant operational rotordynamic problems. In essence, although the system disclosed in the '777 patent provides advantages over prior art designs, the system cost and inherent high maintenance costs significantly reduces its commercial viability.

The proposed technology aims to address the shortcomings of the current systems.

SUMMARY

In an exemplary implementation, provided herein is an energy generation system comprising: a rotatable platform, the platform defining a center, wherein the platform is configured to rotate about the center; a pair of elongated rails coupled to the platform; a first weighted shuttle slidably coupled to the pair of rails; a second weighted shuttle slidably coupled to the pair of rails; a first rack coupled to the first weighted shuttle a second rack coupled to the first weighted shuttle; and a shaft, coupled to a pinion, the pinion rotatably coupled between the first rack and the second rack, wherein the shaft is operably coupled to the platform center.

In another exemplary implementation, provided herein is a method of converting kinetic energy to electricity, implemented in a system comprising: a rotatable platform, the platform defining a center, wherein the platform is configured to rotate about the center; a pair of elongated rails coupled to the platform; a first weighted shuttle slidably coupled to the pair of rails; a second weighted shuttle slidably coupled to the pair of rails; a first rack coupled to the first weighted shuttle a second rack coupled to the first weighted shuttle; a shaft, coupled to a pinion, the pinion rotatably coupled between the first rack and the second rack, wherein the shaft having a first end coupled to a first powertrain, the first powertrain operable to rotate the platform at predetermined revolutions per minute (RPM) and is operably coupled to the platform center and a second end coupled to a commutator; a first brake, operably coupled to the first weighted shuttle, operable to arrest the motion of the weighted shuttle along the pair of rails at RPM that is lower than the predetermined RPM; and a second brake, operably coupled to the first weighted shuttle, operable to arrest the motion of the weighted shuttle along the pair of rails at RPM that is lower than the predetermined RPM, the method comprising: using the first power train, rotating the platform to the predetermined RPM; upon reaching the RPM, simultaneously releasing the first brake and the second brake; and upon the first weighted shuttle, and the second weighted shuttle, each reaching a predetermined distance from the platform center, actuating the commutator.

BRIEF DESCRIPTION OF THE DRAWINGS

The systems and methods for converting gravitational energy to kinetic energy and its storage will become apparent from the following detailed description when read in conjunction with the figures, which are exemplary, not limiting, and in which.

While the disclosure of the systems and methods for converting gravitational energy to kinetic energy is amenable to various modifications and alternative forms, specifics thereof have been shown by way of example in the drawings and will be further described in detail hereinbelow. It should be understood, however, that the intention is not to limit the disclosure to the particular exemplary implementations described. On the contrary, the intention is to cover all modifications, equivalents, and alternatives.

DETAILED DESCRIPTION

Provided herein are exemplary implementations of systems and methods for converting natural gravitational energy to kinetic energy and its utilization.

As mass rotates, a centrifugal force acts on each element of its mass, which tends to shift the elements in a radial direction from the center of rotation. Artificial gravity arises around a rotating load and exerts pressure on it with a vector directed from the center of rotation. In an exemplary implementation, in the systems and methods disclosed, not only the pressure of the created gravitational field is utilized, but also the energy of its rotation relative to space, which may be constrained in a solid frame.

In an exemplary implementation, the proposed device is configured to transfer energy from a flow of rotating artificial gravity, referred to as centrifugal force from a rotating platform to a fixed support (bracket). On the rotating platform, the centrifugal force relative to the rotating platform has an initially low force, and only radial movement at a low speed, and relative to the frame creates a larger force in the form of a moment and an arbitrarily high speed of rotation, which together with the torque, creates a substantially higher force.

In another exemplary implementation, provided herein is a method of converting the energy of natural gravity using a rotating platform, characterized in that two weights are installed on the side surface of the rotating platform symmetrically, with respect to the center of the rotating platform. The weights are mounted on linear bearing carriages and each weight is attached to a toothed rack whose teeth are turned to the center of the rotating platform wherein the length of the rack is approximately equal to the radius of the rotating platform, and a pinion gear with a shaft is installed coaxially with the rotating platform axis and the pinion gear shaft is supported on the rotating platform frame. The pinion gear wheel engages with gear racks and in the process of acceleration of the rotating platform, loads move under the action of artificial gravity pressure arising around rotating loads. With the help of gear racks, this pressure is transmitted to the gear shaft, and in the transition of the radial pressure from the rotating loads mounted on a rotating platform to the shaft supported on a fixed frame (see e.g., FIG. 3, elements 101, 102, 103, and base 104), the pressure is supplemented by rotation, which is contained in artificial gravity and this pressure is transmitted by a mechanical transmission to the first input shaft of the summing differential mechanism, and the second input shaft of the differential mechanism is supplied with torque from the motor accelerating the rotating platform, and the output shaft of the differential mechanism with a total torque is connected by a mechanical transmission to the rotating platform shaft.

Figure 1:
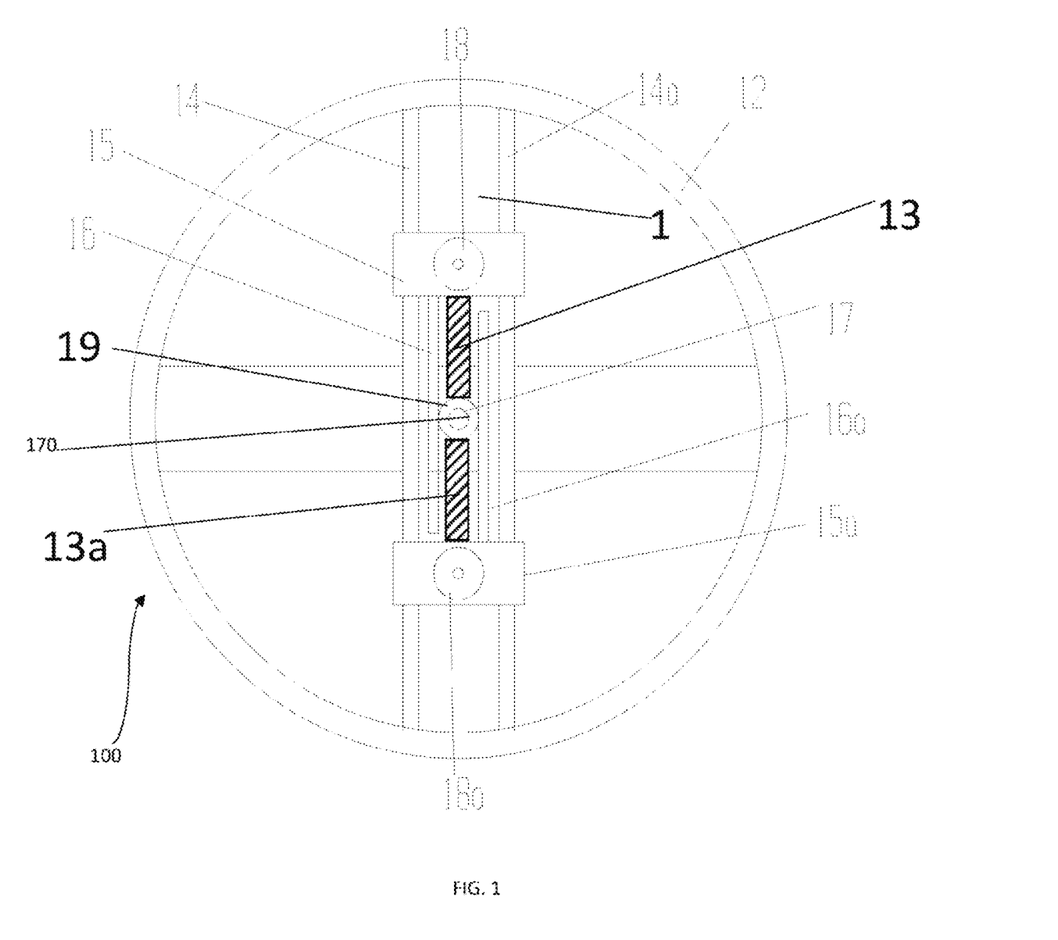
FIG. 1, illustrates an exemplary implementation of the rotating platform for converting gravitational energy to kinetic energy.

In another exemplary implementation, the first sub-assembly is configured to perform the function of a flywheel with a variable moment of inertia See e.g., FIG. 1. It contains a rotating platform 1 with a bracket 101, 102, 103, and base 104 (see e.g., FIG. 3) on which a linear bearing rack 16, 16a with bearing rails 14, 14a is installed. weighted shuttles 18, 18a are installed on the rails. The platform can be driven by a motor 20 through a belt drive 21, 22. and 23.

The second functional sub-assembly controls the movement of the energy flow in the energy storage and generator.

The third sub-assembly can contain a powertrain connected to the load shaft 17 via belt 22. Motor 20 use DC power to rotate towards each other and connected to DC power supply in series. When the electric power of the motor 20 is turned on, the shaft begin to rotate with acceleration and at the same time the rotating platform 1 with the weighted shuttles starts to rotate as well.

During the acceleration period of the rotating platform, the payload is not connected to the shaft 17. When the weighted shuttles rotate around them, artificial gravity arises, which puts pressure on the weighted shuttles. The pressure of this force cause the weighted shuttles to move along rotating platform 1. The movement of the weighted shuttles under the action of centrifugal force with the help of racks 16, 16a creates torque on the rotating platform. The rotating platform shaft 17 is supported on the frame of the device. Therefore, when the pressure of the centrifugal force is transferred from the rotating plate, relative to which the centrifugal force has only radial movement, to the shaft 17 supported on the frame, the centrifugal force returns to its natural speed of rotation. In this case, the flow of artificial gravity is converted into mechanical (kinetic) power. As a result of the transition of the energy flow from a rotating platform to a permanent support, the device converts the energy of artificial gravity into mechanical energy. Through a belt drive 22, this energy is transmitted to the generator shaft 21 The rotation of the motor/generator 30 generates electrical and mechanical energy, which helps to accelerate the rotating platform to the motor 20 using the energy of centrifugal forces. When the weighted shuttles move, they compress (or stretch) the springs 13, 13a, which also accumulate the energy created by the centrifugal force.

The process of accelerating the rotation of the rotating platform with the simultaneous accumulation of kinetic energy due to an increase in the speed of rotation of the weighted shuttles and the changing radius of their rotation, as well as the potential energy of compression of the springs, continues until the weighted shuttles move to a given radius ($L_{18}$, $L_{18a}$) of their rotation and speed of rotation (RPM).

When the device accumulates a given amount of energy, the weighted shuttles is connected to its output shaft 21. The weighted shuttles rotation speed must correspond to the motor/generator shaft's 21 rotation speed, with the torque of the weighted shuttles rotating corresponding to the total moment on the load shaft 21 created by centrifugal forces, spring(s) 13, 13a pressure forces, and the moment created by the motor generator 20. Under this implementation, the system will give the accumulated energy to the weighted shuttles, while at the same time generating energy of centrifugal force.

Definitions

The term "coupled", including its various forms such as "operably coupling", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

In addition, the term "slidably coupled" is used in its broadest sense to refer to elements which are coupled in a way that permits one element to slide or translate within, or with respect to another element.

In addition, for the purposes of the present disclosure, directional or positional terms such as "top", "bottom", "upper," "lower," "side," "front," "frontal," "forward," "rear," "rearward," "back," "trailing," "above," "below," "left," "right," "radial," "vertical," "upward," "downward," "outer," "inner," "exterior," "interior," "intermediate,", "apical", "basal", etc., are merely used for convenience in describing the various exemplary implementations of the present disclosure.

The terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term.

Reference throughout the specification to "one exemplary implementation", "another exemplary implementation", "an exemplary implementation", and so forth, means that a particular element (e.g., step, feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

In the context of the disclosure, the term "operable" means the system and/or the device, or a certain element or step is fully functional, sized, adapted and calibrated, comprises elements for, and meets applicable operability requirements to perform a recited function when activated, coupled, implemented, actuated, effected, or realized. In relation to systems, the term "operable" means the system is fully functional and calibrated, having the necessary elements, as well as the mechanisms for, and meets applicable operability requirements to perform a recited function when executed by a user.

As used herein, the term "commutator" shall include, but not be limited to, commutators, slip rings and any other moving surface onto which or from which an electric current is directed or generated.

The term "about", when used in the description of the technology and/or claims means that amounts, sizes, formulations, parameters, and other quantities and characteristics are reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and may include the end points of any range provided including, for example ±25%, or ±20%, specifically, ±15%, or ±10%, more specifically, ±5% of the indicated value of the disclosed amounts, sizes, formulations, parameters, and other quantities and characteristics.

A more complete understanding of the methods, systems, sub systems and kits for converting natural gravitational energy to kinetic energy and its utilization, can be obtained by reference to the accompanying drawings. These figures (also referred to herein as "FIG.") are merely schematic representations based on convenience and the case of demonstrating the present disclosure, and are, therefore, not intended to indicate relative size, scale and dimensions of the devices or components thereof, and/or to define or limit the scope of the exemplary implementations. Although specific terms are used in the following description for the sake of clarity, these terms are intended to refer only to the particular structure of the exemplary implementations selected for illustration in the drawings, and are not intended to define or limit the scope of the disclosure. In the drawings and the following description below, it is to be understood that like numeric designations refer to components of like function.

Figure 2:
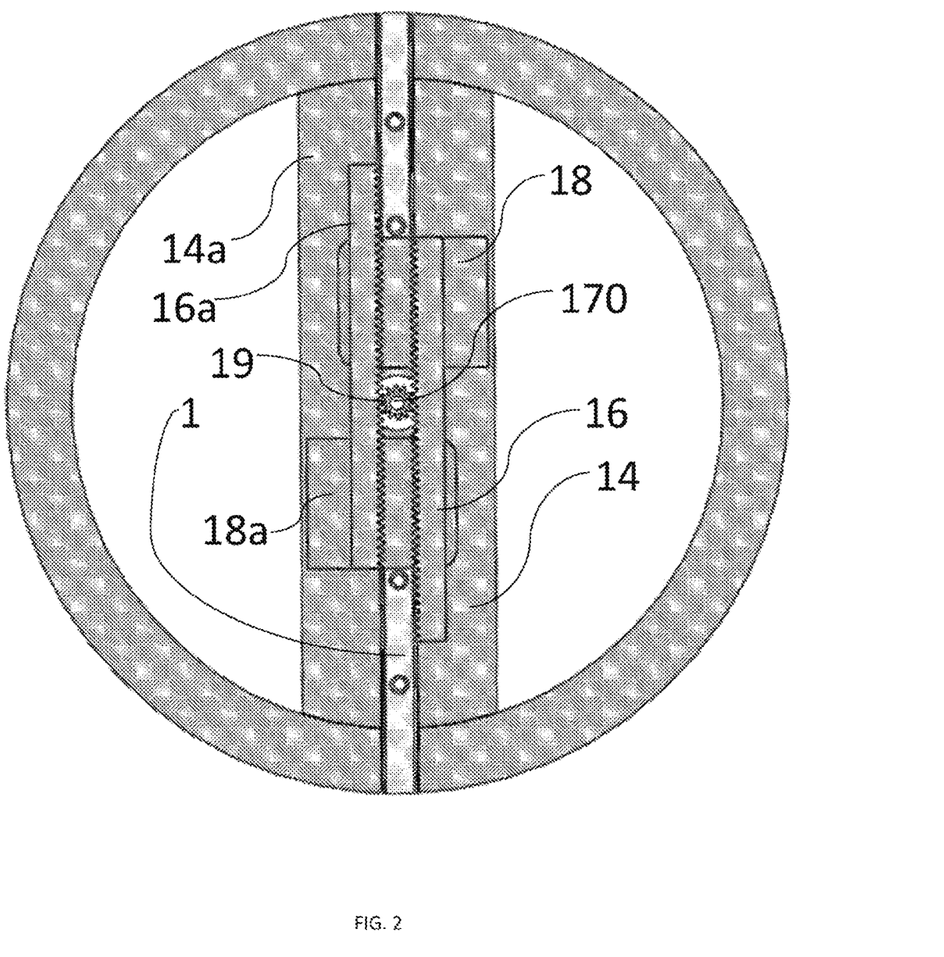
FIG. 2 illustrates another exemplary implementation of the system.

Turning now to FIGS. 1-2, illustrating an exemplary implementation of system 100.

As illustrated, energy generation system 100 comprising: rotatable platform 1 (e.g., a disc), rotatable platform 1 defining center 170, wherein rotatable platform 1 is configured to rotate about center 170; pair of elongated rails 14, 14a coupled to rotatable platform 1; first weighted shuttle 18 slidably coupled to pair of rails 14, 14a; second weighted shuttle 18a slidably coupled to pair of rails 14, 14a; first rack 16 coupled to first weighted shuttle 18, second rack 16a coupled to second weighted shuttle 18a; and shaft 17, coupled to pinion 19, pinion 19 rotatably coupled between first rack 16 and second rack 16a, wherein shaft 17 is operably coupled to platform center 170.

As illustrated, rails 14, 14a are sized and configured to span rotatable platform 1, thus allowing weighted shuttles 18, 18a to radially extend to the edge of rotatable platform 1. It is noted, that rotating platform does not necessarily needs to be a disc, but can also be a rectangular slab sized and configured to accommodate rails 14, 14a. In certain exemplary implementations, each of weighted shuttles 18, 18a can weigh between about 100 g, and about 2000 g. As used herein, the term about refers to +10%. As illustrated in FIGS. 1, and 2, first weighted shuttle 18, and second weighted shuttle 18a are disposed equidistance from rotatable platform 1 center 170

In another exemplary implementation, system 100, further comprises: first biasing means 13, configured to urge first weighted shuttle 18 toward platform center 170 at predetermined force; and second biasing means 13a, configured to urge second weighted shuttle 18a toward platform center 170 at the same predetermined force as the first biasing means 13. As used herein, the term "biasing means" refer to only such means as are able to repetitively provide substantially complete position recovery of the first and second weighted shuttles 18, 18a relative to the rotatable platform 1 center 170. Representative biasing elements (or means) include but are not limited to springs (e.g., elastomeric or metal springs, torsion springs, coil springs, leaf springs, tension springs, compression springs, spiral springs, volute springs, flat springs, and the like), pneumatic devices, hydraulic devices, magnets, and the like, and combinations thereof. Likewise, "biasing means" as used herein refers to one or more members that applies an urging force between two elements.

As further illustrated in FIGS. 1, and 2, first rack 16 and second rack 16a have the same length, and can be sized as needed, for example, between about 10 cm, and about 50 cm (again, as used herein, the term about refers to ±10%). Each of first and second racks 16, 16a respectively, forms a rack-and-pinion system with pinion 19, whereby the length of each of first rack 16, and second rack 16a is three times (3×) the outer diameter of pinion 19 gear. This ratio was surprisingly found to be beneficial in maintaining the stability of the system at the operating revolution per minute (RPMs), keeping the engagement of pinion gear 19 with each of first and second racks 16, 16a respectively.

Figure 3:
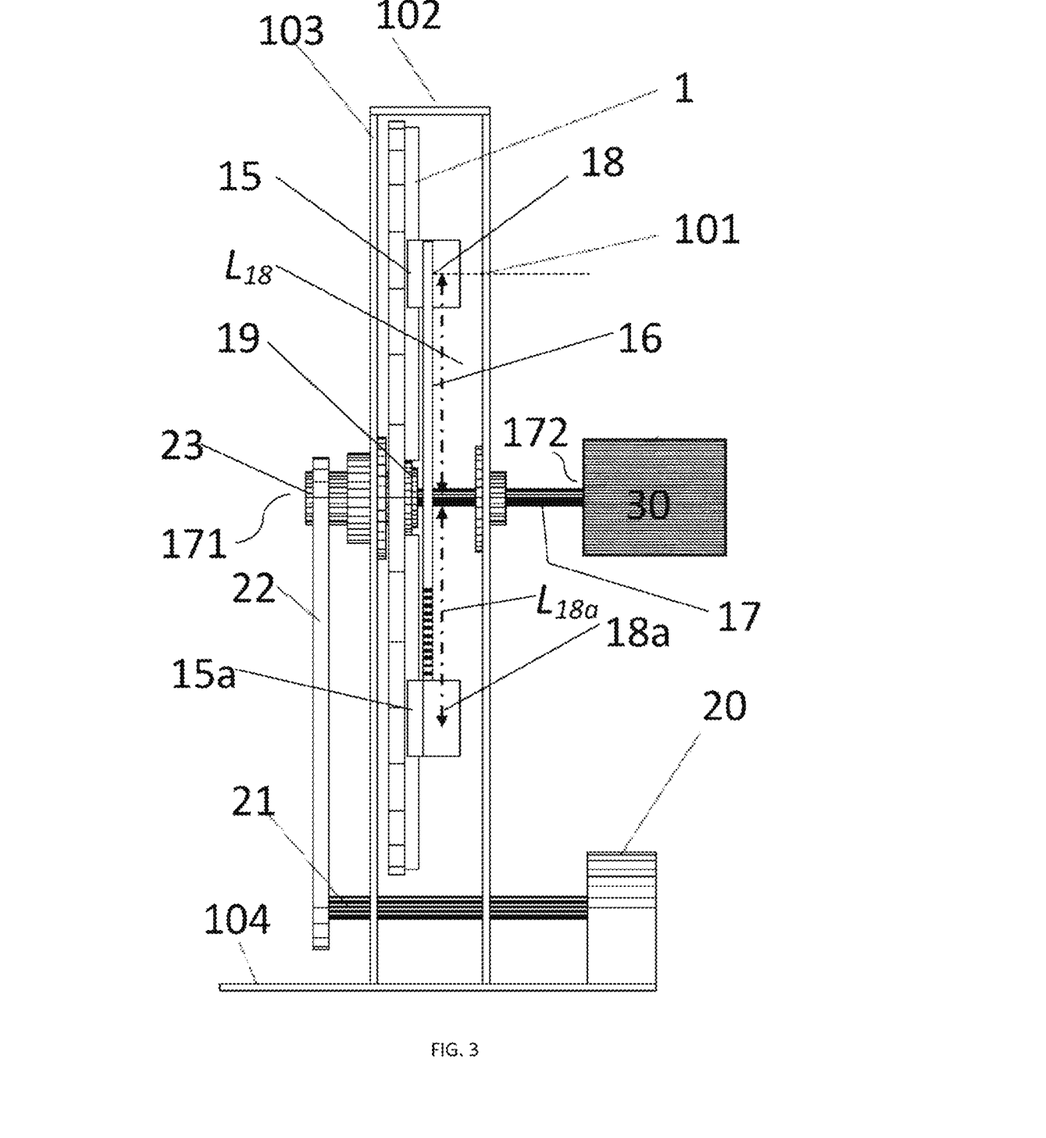
FIG. 3, illustrates the system as coupled to a powertrain.

Turning now to FIG. 3, illustrating an exemplary implementation where shaft 17 having first (proximal) end 171 coupled to first powertrain, first powertrain operable to rotate rotatable platform 1 at predetermined revolutions per minute (RPM), for example, between about 30 RPM and about 3000 RPM (again, as used herein, the term about refers to +10%). As further illustrated in FIG. 3, proximal end 171 of shaft 17 is coupled in an exemplary implementation, to belt 22 via gear box 23, the belt coupled to axle 21, which it coupled to motor 20. As used herein, the term "first powertrain" is used to describe a motor and a drivetrain where the latter is understood to include the various components that convey torque to rotatable platform 1, while the term "drivetrain", is to be construed as the intervening mechanism by which power is transmitted from a prime mover to a final drive. For example, first powertrain can be motor 20, axle 21, belt 22, and gear box 23. In this exemplary implementation, the first powertrain "drivetrain"

refers to axle 21, belt 22, and gear box 23. The first powertrain can be at least one of: a solar powertrain, an electric powertrain, and a hydroelectric powertrain. In other words, motor 20 can be solar powered, an electric motor, a hydroelectric powered motor or any combination of one or more of the foregoing.

Figure 4:
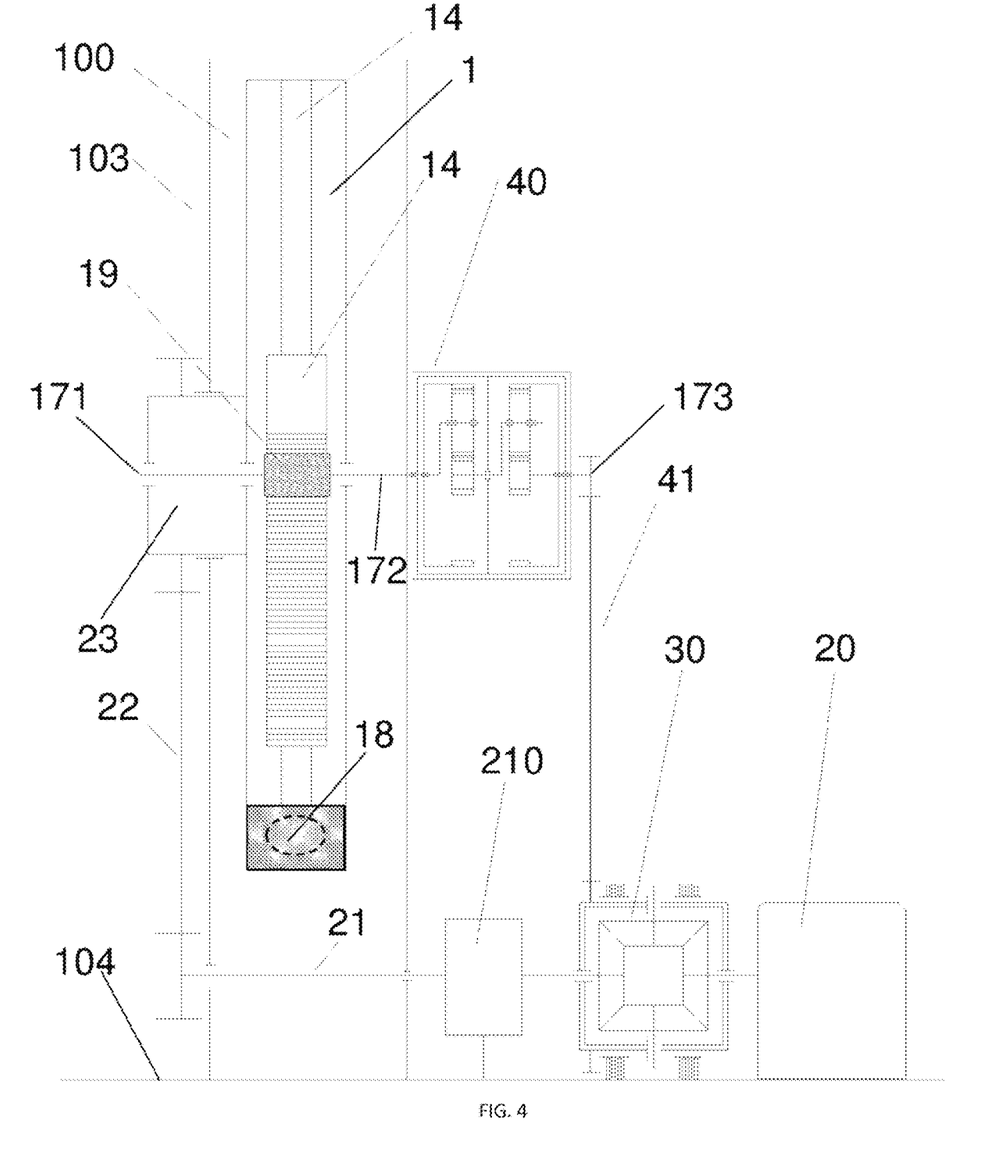
FIG. 4, illustrates an exemplary implementation of the system including a mechanical engagement mechanism to couple the shaft to the power generator/motor.

Turning now to FIG. 4, illustrating the typical operating configuration. As illustrated, rotation from gear box 23 with the shaft 17 having end 173 is transmitted to clutch 40. After the clutch 40, rotation is transmitted through belt drive 41 to, for example, commutator 30, coupled to motor 20. The output of motor 20 is then transmitted through axle and the belt drive 22 transfers the rotation and torque of the shaft to rotating platform 1.

In yet another exemplary implementation, system 100 disclosed herein, and which is implementing the methods described, can further comprise a first brake 15, operably coupled to first weighted shuttle 18, operable to arrest the motion of weighted shuttle 18 along the pair of rails 14, 14a at RPM that is lower than the predetermined RPM; and second brake 15a, operably coupled to the second weighted shuttle 18a (see e.g., FIG. 3), operable to arrest the slidable motion of second weighted shuttle 18a along pair of rails 14, 14a at RPM that is lower than the predetermined RPM. The first and second brakes 15, 15a respectively can be friction based Furthermore and in another exemplary implementation, shaft 17 having second (distal) end 172 is operably coupled to a commutator. As indicated, the commutator can be any moving surface onto which, or from which an electric current is directed or generated. Typically, commutator includes a generally cylindrical dielectric body and a plurality of commutator segments. The dielectric body is made of a resin material, and the commutator segments are arranged along an outer peripheral surface of the dielectric body in the circumferential direction of the dielectric body. Such a commutator can be formed by rolling a commutator plate material into a cylindrical shape. Then, a resin material in a liquid state is filled into an inner space of the cylindrically rolled plate material. After solidification of the resin material, the cylindrically rolled plate material is cut and is divided into a plurality of segments at generally equal angular intervals. Each divided segment forms the commutator segment, and the solidified resin material forms the dielectric body.

In a generator such as a D.C. motor, generally, a pair of brushes is arranged on a stator and the commutator is arranged on a rotor. In the rotor, a plurality of armature windings are connected to the commutator segments, respectively. The pair of brushes is sequentially pressed against the commutator segments to supply the armature windings with electric currents, thereby rotating the rotor.

In an exemplary implementation, the methods disclosed are implemented using the systems described. Accordingly, provided herein is a method of converting kinetic energy to electricity, implemented in system comprising: rotatable platform 1, rotatable platform 1 defining center 170, wherein rotatable platform 1 is configured to rotate about center 170; pair of elongated rails 14, 14a coupled to rotatable platform 1; first weighted shuttle 18 slidably coupled to pair of rails 14, 14a; second weighted shuttle 18a slidably coupled to pair of rails 14, 14a; first rack 16 coupled to first weighted shuttle 18, second rack coupled to second weighted shuttle 18a; shaft 17, coupled to pinion (gear) 19, pinion (gear) 19 rotatably coupled between first rack 16 and second rack 16a, wherein shaft 17 having first end 171 coupled to first powertrain, first powertrain operable to rotate rotatable platform 1 at predetermined revolutions per minute (RPM) and is operably coupled to rotatable platform 1 center 170 and second end 172 coupled to commutator 30; first brake 15, operably coupled to first weighted shuttle 18, operable to arrest motion of first weighted shuttle 18 along pair of rails 14, 14a at RPM that is lower than predetermined RPM; and second brake 15a, operably coupled to second weighted shuttle 18a, operable to arrest motion of second weighted shuttle 18a along pair of rails 14, 14a at RPM that is lower than predetermined RPM, the method comprising: using the first power train, rotating the rotatable platform 1 to the predetermined RPM; upon reaching the RPM, simultaneously releasing the first brake 15 and the second brake 15a; and upon the first weighted shuttle 18, and the second weighted shuttle 18a, each reaching a predetermined distance $L_{18}$, $L_{18a}$ (see e.g., FIG. 3) from the rotatable platform 1 center 170, actuating the commutator 30. In other words, only once the rotating platform has achieved the predetermined RPM, are the brakes 15, 15a released, causing weighted shuttles 18, 18a to radially translate along rails 14, 14a to a predetermined distance from the shaft 17, at which point clutch 40 is engaged, coupling shaft end 173 to belt drive 41, transferring the elevated torque to commutator 30. As further illustrated, harnessing the torque on the shaft resulting from changing in work performed by the translated weighted shuttle without the need to achieve the predetermined RPMs with the translated weighted shuttles results in an efficient power transfer to any generator/motor.

Figure 5:
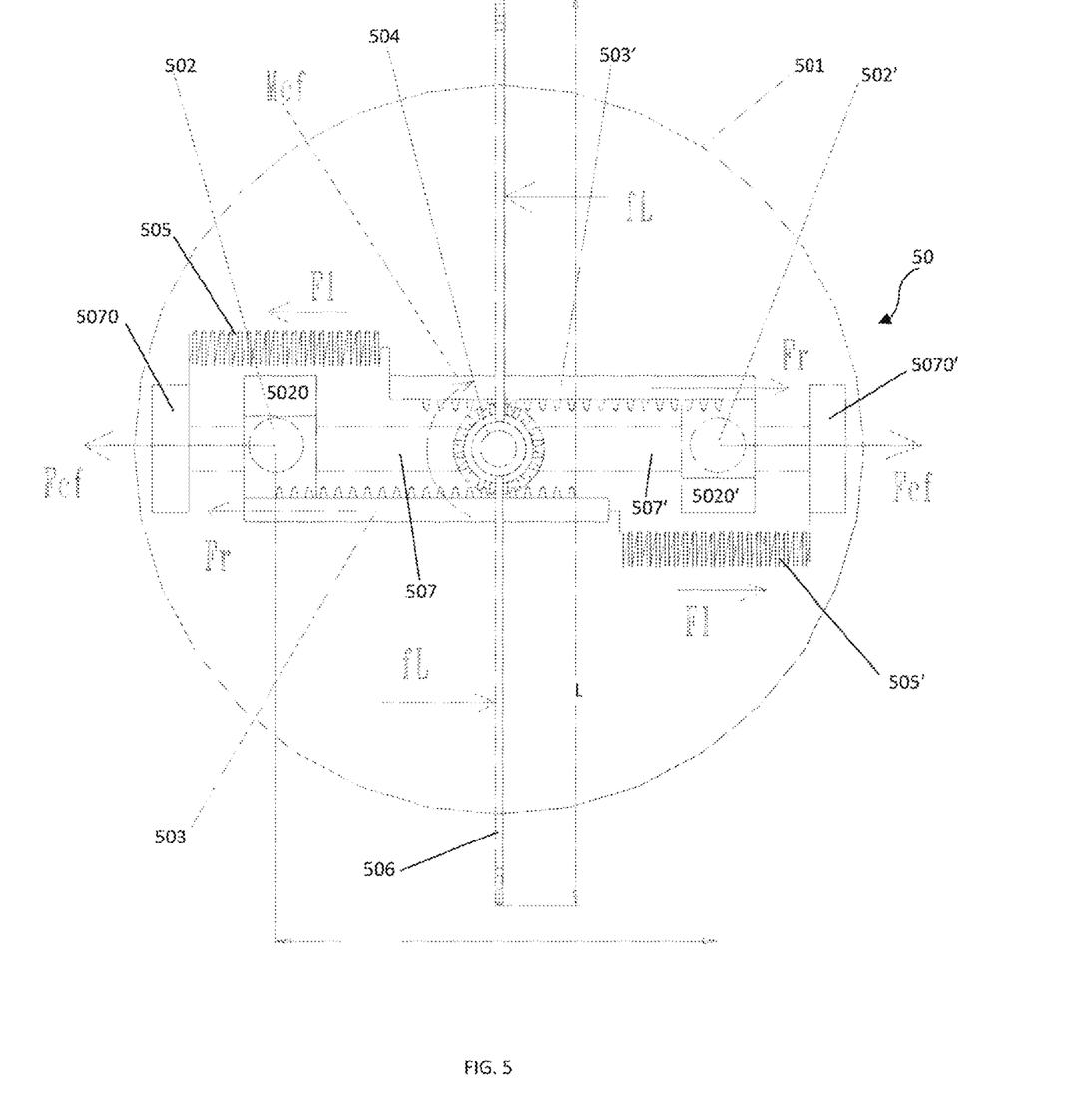
FIG. 5, illustrates an exemplary implementation of the system to convert gravitational energy to kinetic energy with controlled radial motion of the load.

Turning now to FIG. 5, illustrating another exemplary implementation of a centrifugal motor, for converting gravitational motion to energy using only the pressure and rotation on the shaft. To achieve the energy conversion, without radial movement of loads 502, 502', the force on the gear shaft 504 of the moment must be equal to the force created by the air on rotational damper 506 air and the moment created by the centrifugal force on the same gear shaft 504.

As illustrated in FIG. 5, motor 50 comprises: rotating platform 501, two linear bearings 507, 507' with carriages 5020, 5020' and weights 502, 502', two racks mounted on carriages 503 and 503', a gear shaft 504, springs 505, 505', and rotational damper 506.

Example 1

In an exemplary implementation the motor was built whereby each weight of the rotating weights 502, 502' 0.2 kilograms inclusive of racks 503, 503' and carriage 5020, 5020' on each side. The radius of rotation of the center of mass of the loads in a stable state of rotation of the platform R is 0.25 meters (m), with area of 0.125 m². The platform 501 was rotated at about 300 RPM (5 revolutions per second).

Calculating for the linear velocity of loads 502, 502':

$$V = 2\pi \times R \times n$$

where: V is the linear velocity in m/sec, R is the radius of rotation in m, and n is the RPM/60, yields linear velocity of 7.8 m/sec.

The centrifugal force ($F_{cf}$) acting on carriage 507, 507' is calculated as:

$$F_{cf} = 0.2 \cdot V^2 / R,$$

where: Fcf is the centrifugal force in Newtons (N), V is the linear velocity in m/sec and R is the rotation radius or $F_{cf} = 48.7N$ Assuming a rectangular shape of the rotational damper, rotating at up to 10 m/sec the pressure exerted by the air resistance reaches about 50 N/m². Taking into account the area of the rotational damper, a force $F_1$ in the order of 2.5 N acts on each half of the rotational damper.

Balancing the torque acting on the gear shaft ($M_{cf}$) 504 with the force acting on the rotational damper 506 ($M_1$) can be calculated by:

$$M_1 = F_1 \cdot L/4$$

where: L is the length of the rotational damper in m; and $M_1$ is equal to 0.75 Nm (per half rotational damper), and the total force generated by the rotational damper 506 is 1.5 Nm.

Now, the torque acting on gear shaft 504 ($M_{cf}$) can be calculated by:

$$M_{cf} = 2F_{cf} \cdot r$$

where: $M_{cf}$ is the torque acting on the gear shaft 504 in, $F_{cf}$ is the centrifugal force in N, and r is gear shaft 504 radius in m. With a gear shaft 504 radius r=0.015 m, $M_{cf}$ as calculated was about 1.46 Nm.

As shown, the torque generated $M_1$ by the rotational damper 506 (1.5 Nm) is slightly larger than the torque acting on gear shaft 504 ($M_{cf}$) (1.46 Nm). To balance the torque for a particular geometry of the rotational damper, a biasing element 505, 505' (e.g., a spring) can be used and the biasing direction will determine the correction.

The torque exerted by the biasing element $M_{sp}$ (Nm) is calculated by:

$$M_{sp} = (\pm) 2 \cdot F_{sp} \cdot r$$

where the sign will depend on whether biaser 505, 505' biases the racks 503, 503' toward bearing 507, 507' stopper 5070, 5070' or away from stopper 5070, 5070'.

Since r is fixed at 0.015 m, and there is a difference of 0.4 Nm, and $M_{cf} = M_1 + M_{sp}$ a biasing element (spring) having a biasing force $F_{sp}$ of 1.33N biasing the racks 503, 503' away from stoppers 5070, 5070' will result in balanced torque ($M_{cf} = M_1$).

Accordingly and in an exemplary implementation, provided herein is a an energy generation system comprising: a rotatable platform, the rotatable platform defining a center, wherein the rotatable platform is configured to rotate about the center; a pair of elongated rails coupled to the rotatable platform; a first weighted shuttle slidably coupled to the pair of rails; a second weighted shuttle slidably coupled to the pair of rails; a first rack coupled to the first weighted shuttle a second rack coupled to the second weighted shuttle; and a shaft, coupled to a pinion, the pinion rotatably coupled between the first rack and the second rack, wherein the shaft is operably coupled to, and coaxial with the platform center, the shaft supported on a fixed frame, wherein (i) the rotatable platform is a quadrilateral slab, (ii) the pair of rails span the platform, (iii) the first weighted shuttle, and the second weighted shuttle are disposed equidistance from the rotatable platform center, the energy generation system (iv) further comprising: a first biasing means, configured to urge the first weighted shuttle toward the platform center at a predetermined force; and a second biasing means, configured to urge the second weighted shuttle toward the platform center at the same predetermined force as the first biasing means, wherein (v) the first rack and the second rack have the same length, (vi) the length of the first rack, and the second rack is no less than three times the outer diameter (r) of the pinion gear, wherein (vii) the shaft having a first end coupled to a first powertrain, the first powertrain operable to rotate the platform at predetermined revolutions per minute (RPM), (viii) the shaft having a second end operably coupled to a commutator, wherein (ix) the first powertrain is at least one of: a solar powertrain, an electric powertrain, and a hydroelectric powertrain, the energy generation system further comprising (x) a first brake, operably coupled to the first weighted shuttle, operable to arrest the motion of the weighted shuttle along the pair of rails at RPM that is lower than the predetermined RPM; and a second brake, operably coupled to the second weighted shuttle, operable to arrest the motion of the second weighted shuttle along the pair of rails at RPM that is lower than the predetermined RPM, and (xi) further comprising a rotational damper coupled apically to the shaft, wherein the rotational damper is sized and configured to exert a torque on the shaft, which is equal to the torque acting in the shaft by the rotating weighted shuttle.

In another exemplary implementation, provided herein is a method of converting kinetic energy to electricity, implemented in a system comprising: a rotatable platform, the rotatable platform defining a center, wherein the rotatable platform is configured to rotate about the center; a pair of elongated rails coupled to the rotatable platform; a first weighted shuttle slidably coupled to the pair of rails; a second weighted shuttle slidably coupled to the pair of rails; a first rack coupled to the first weighted shuttle a second rack coupled to the second weighted shuttle; a shaft, coupled to a pinion, the pinion rotatably coupled between the first rack and the second rack, wherein the shaft is operably coupled to, and coaxial with the platform center, the shaft supported on a fixed frame, wherein the shaft having a first end coupled to a first powertrain, the first powertrain operable to rotate the rotatable platform at predetermined revolutions per minute (RPM) and is operably coupled to the rotatable platform center and a second end coupled to a commutator; a first brake, operably coupled to the first weighted shuttle, operable to arrest the motion of the weighted shuttle along the pair of rails at RPM that is lower than the predetermined RPM; and a second brake, operably coupled to the second weighted shuttle, operable to arrest the motion of the second weighted shuttle along the pair of rails at RPM that is lower than the predetermined RPM, the method comprising: using the first power train, rotating the platform to the predetermined RPM; upon reaching the RPM, simultaneously releasing the first brake and the second brake; and upon the first weighted shuttle, and the second weighted shuttle, each reaching a predetermined distance from the platform center, actuating the commutator, wherein (xii) the rotatable platform is a disc. (xiii) the pair of rails span the platform, the system used to implement the methods (xiv) further comprises: a first biasing means, configured to urge the first weighted shuttle toward the platform center at a predetermined force; and a second biasing means, configured to urge the second weighted shuttle toward the platform center at the same predetermined force as the first biasing means, whereby (xv) in the system the first rack and the second rack each has the same length, wherein (xvi) the length of the first rack, and the second rack is three times the outer diameter of the pinion gear, (xvii) the second end of the shaft is coupled to a drivetrain operable to maintain rotation of the platform, and wherein (xviii) the system used to implement the methods disclosed further comprises a rotational damper coupled apically to the shaft, wherein the rotational damper is sized and configured to exert a torque on the shaft, which is equal to the torque acting in the shaft by the rotating weighted shuttle.

While in the foregoing specification the methods, systems, sub systems and kits of for converting gravitational energy to kinetic energy described herein, have been described in relation to certain exemplary implementations, and many details are set forth for purpose of illustration, it will be apparent to those skilled in the art that the disclosure of the alignment methods, implementable using the systems disclosed herein are susceptible to additional implementations and that certain of the details described in this specification and as are more fully delineated in the following claims can be varied considerably without departing from the basic principles disclosed herein.

What is claimed:

1. An energy generation system comprising:
   a) a rotatable platform, the rotatable platform defining a center, wherein the rotatable platform is configured to rotate about the center;
   b) a pair of elongated rails coupled to the rotatable platform;
   c) a first weighted shuttle slidably coupled to the pair of rails;
   d) a second weighted shuttle slidably coupled to the pair of rails;
   e) a first rack coupled to the first weighted shuttle f) a second rack coupled to the second weighted shuttle; and
   g) a shaft, coupled to a pinion, the pinion rotatably coupled between the first rack and the second rack, wherein the shaft is operably coupled to, and coaxial with the platform center, the shaft supported on a fixed frame.

2. The system of claim 1, wherein the rotatable platform is a quadrilateral slab.

3. The system of claim 1, wherein the pair of rails span the platform.

4. The system of claim 3 wherein the first weighted shuttle, and the second weighted shuttle are disposed equidistance from the rotatable platform center.

5. The system of claim 1, further comprising:
   a) a first biasing means, configured to urge the first weighted shuttle toward the platform center at a predetermined force; and
   b) a second biasing means, configured to urge the second weighted shuttle toward the platform center at the same predetermined force as the first biasing means.

6. The system of claim 1, wherein the first rack and the second rack have the same length.

7. The system of claim 6, wherein the length of the first rack, and the second rack is no less than three times the outer diameter of the pinion gear.

8. The system of claim 1, wherein the shaft having a first end coupled to a first powertrain, the first powertrain operable to rotate the platform at predetermined revolutions per minute (RPM).

9. The system of claim 8, wherein the shaft having a second end operably coupled to a commutator.

10. The system of claim 8, wherein the first powertrain is at least one of: a solar powertrain, an electric powertrain, and a hydroelectric powertrain.

11. The system of claim 8, further comprising:
   a) a first brake, operably coupled to the first weighted shuttle, operable to arrest the motion of the weighted shuttle along the pair of rails at RPM that is lower than the predetermined RPM; and
   b) a second brake, operably coupled to the second weighted shuttle, operable to arrest the motion of the second weighted shuttle along the pair of rails at RPM that is lower than the predetermined RPM.

12. The system of claim 5, further comprising a rotational damper coupled apically to the shaft, wherein the rotational damper is sized and configured to exert a torque on the shaft, which is equal to the torque acting in the shaft by the rotating weighted shuttle.

13. A method of converting kinetic energy to electricity, implemented in a system comprising: a rotatable platform, the rotatable platform defining a center, wherein the rotatable platform is configured to rotate about the center; a pair of elongated rails coupled to the rotatable platform; a first weighted shuttle slidably coupled to the pair of rails; a second weighted shuttle slidably coupled to the pair of rails; a first rack coupled to the first weighted shuttle a second rack coupled to the second weighted shuttle; a shaft, coupled to a pinion, the pinion rotatably coupled between the first rack and the second rack, wherein the shaft is operably coupled to, and coaxial with the platform center, the shaft supported on a fixed frame, wherein the shaft having a first end coupled to a first powertrain, the first powertrain operable to rotate the rotatable platform at predetermined revolutions per minute (RPM) and is operably coupled to the rotatable platform center and a second end coupled to a commutator; a first brake, operably coupled to the first weighted shuttle, operable to arrest the motion of the weighted shuttle along the pair of rails at RPM that is lower than the predetermined RPM; and a second brake, operably coupled to the second weighted shuttle, operable to arrest the motion of the second weighted shuttle along the pair of rails at RPM that is lower than the predetermined RPM, the method comprising:
   a) using the first power train, rotating the platform to the predetermined RPM;
   b) upon reaching the RPM, simultaneously releasing the first brake and the second brake; and
   c) upon the first weighted shuttle, and the second weighted shuttle, each reaching a predetermined distance from the platform center, actuating the commutator.

14. The method of claim 13, wherein the rotatable platform is a disc.

15. The method of claim 13, wherein the pair of rails span the platform.

16. The method of claim 13, wherein the system further comprises:
   a) a first biasing means, configured to urge the first weighted shuttle toward the platform center at a predetermined force; and
   b) a second biasing means, configured to urge the second weighted shuttle toward the platform center at the same predetermined force as the first biasing means.

17. The method of claim 13, whereby in the system the first rack and the second rack each has the same length.

18. The method of claim 17, wherein the length of the first rack, and the second rack is three times the outer diameter of the pinion gear.

19. The method of claim 13, wherein the second end of the shaft is coupled to a drivetrain operable to maintain rotation of the platform.

20. The method of claim 16, wherein the system further comprises a rotational damper coupled apically to the shaft, wherein the rotational damper is sized and configured to exert a torque on the shaft, which is equal to the torque acting in the shaft by the rotating weighted shuttle.

* * * * *